United States Patent [19]

Zilligen et al.

[11] Patent Number: 4,993,149
[45] Date of Patent: Feb. 19, 1991

[54] PROCESS FOR FORMING A TERMINATION ON AN ELECTRICAL CONDUCTOR

[75] Inventors: James A. Zilligen, Simpsonville; Richard J. Feeny, Greenville, both of S.C.

[73] Assignee: FTZ Industries, Inc., Simpsonville, S.C.

[21] Appl. No.: 403,025

[22] Filed: Aug. 31, 1989

Related U.S. Application Data

[60] Continuation of Ser. No. 6,318, Jan. 14, 1987, abandoned, which is a division of Ser. No. 780,190, Sep. 26, 1985, abandoned, which is a division of Ser. No. 502,615, Jun. 9, 1983, Pat. No. 4,547,240.

[51] Int. Cl.$^5$ .............................................. H01R 43/04
[52] U.S. Cl. ......................................... 29/859; 29/863; 29/868; 29/877; 29/883; 174/84 C; 174/DIG. 8; 156/86; 264/230
[58] Field of Search ................ 29/874, 877, 878, 879, 29/859, 863, 868, 883; 264/230; 174/84 C, DIG. 8; 439/730, 93 L; 156/85, 86

[56] References Cited

U.S. PATENT DOCUMENTS 2,863,132  12/1958  Sowa .......................... 174/DIG. 8 X
3,291,894  12/1966  Sampson ......................... 439/730 X
4,151,364   4/1979  Ellis ................................. 174/84 C
4,547,240  10/1985  Zilligen et al. ....................... 156/85

Primary Examiner—Carl E. Hall
Attorney, Agent, or Firm—Bailey & Hardaway

[57] ABSTRACT

An electrical connector utilizing a crimpable ferrule with an electrical insulation sleeve thereover, and a transparent outer sleeve surrounding the ferrule and insulation sleeve, with the transparent outer sleeve formed of coextruded, multi-layer material with at least one layer being oriented and heat-shrinkable, and with the inner layer being a heat-activable adhesive. A portion of the outer sleeve is preshrunk to aid in the use thereof. The electrical connector in accordance with this invention is produced by placing a crimpable ferrule having an insulation sleeve thereon upon a first support, with the outer sleeve upon a second support, with both vertically oriented and coaxially arranged, and with the support for the outer sleeve at a lower elevation than the other support. The arrangement is passed through a heating zone to partially shrink a portion of the outer sleeve about the insulating sleeve, and to activate an inner adhesive layer on said outer sleeve into adhesion with the insulating sleeve.

1 Claim, 2 Drawing Sheets

PROCESS FOR FORMING A TERMINATION ON AN ELECTRICAL CONDUCTOR

This is a continuation of application Ser. No. 07/006,318, filed 1,14/87, now abandoned, which is a division of application Ser. No. 06/780,190, filed 09/26/85, abandoned, which is a division of application of Ser. No. 502,615, filed 06/09/83 which is now U.S. Pat. No. 4,547,240.

BACKGROUND OF THE INVENTION

This invention relates generally to the art of electrical connectors, and more particularly, to electrical connectors having a heat-shrinkable sleeve for securing an electrical connection.

The art of establishing electrical communication between diverse components has been actively pursued for many years. This is evidenced by the vast number of patents directed to electrical connections of one sort or another. Various crimpable devices have been devised for connecting to conductors such that a malleable ferrule is crimped about each of two conductors such that electrical communication is established between the two conductors via the ferrule.

One such device is disclosed in U.S. Pat. No. 4,151,264 to Ellis wherein a crimpable ferrule is surrounded by a heat-shrinkable sleeve with a tacky coating on the interior thereof. Another such device is described in U.S. Pat. No. 3,708,611 to Dinger wherein malleable metal and heat-shrinkable sleeves are again utilized for the connection of two conductors. The use of a heat-shrinkable sleeve is also disclosed in U.S. Pat. No. 4,142,592 to Brusselmans. Another such device is disclosed in U.S. Pat. No. 4,208,788 to Siden wherein a crimpable ferrule is selectively removable from the heat-shrinkable sleeve.

U.S. Patent Reissue No. 30,817 to Loyd, et al., like the patent to Ellis discloses a coated inner layer of tacky material within a heat-shrinkable sleeve, U.S. Pat. No. 3,143,595 to Martin discloses a malleable ferrule with a heat-shrinkable sleeve of insulating polytetrafluoroethylene thereabout.

The overall object of these prior art connectors has been to effect an electrical connection between two conductors and simultaneously seal out deleterious atmospheric influences.

U.S. Pat. No. 2,855,581 to Freedom discloses an electrical mechanical connection for attachment to initially a single conductor. The Freedom patent applies a nylon sleeve to a metallic ferrule by heating the ferrule and forcing the heated ferrule into the nylon sleeve. U.S. Pat. No. 2,863,132 to Sowa discloses a similar type connector utilizing a heat or solvent-shrinkable insulating sleeve on a ferrule.

While these prior art devices perform satisfactorily for many purposes, there have been no totally satisfactory processes for forming prefabricated connectors, and particularly the connectors produced by the prior art have not always lent themselves to easy use by the ultimate consumer.

SUMMARY OF THE INVENTION

It is thus an object of this invention to provide a novel electrical connector.

It is a further object of this invention to provide such an electrical connector which permits viewing of a conductor when a establishing a connection.

It is a still further object of this invention to provide a novel process of forming prefabricated electrical connectors.

These, as well as other objects, are accomplished by an electrical connector utilizing a crimpable ferrule with an electrical insulation sleeve thereover, and a transparent outer sleeve surrounding the ferrule and insulation sleeve, with the transparent outer sleeve formed of coextruded, multi-layer material with at least one layer being oriented and heat-shrinkable, and with the inner layer being a heat-activable adhesive. A portion of the outer sleeve is preshrunk to aid in the use thereof. The electrical connector in accordance with this invention is produced by placing a crimpable ferrule having an insulation sleeve thereon upon a first support, with the outer sleeve upon a second support, with both vertically oriented and coaxially arranged, and with the support for the outer sleeve at a lower elevation than the other support. The arrangement is passed through a heating zone to partially shrink a portion of the outer sleeve about the insulating sleeve, and to activate an inner adhesive layer on said outer sleeve into adhesion with the insulating sleeve.

DETAILED DESCRIPTION

In accordance with this invention it has been found that a heat-shrinkable outer sleeve with superior transparency properties and with a heat-activable adhesive on the interior thereof possesses superior use characteristics. It has further been found that these characteristics exist with both butt connectors and with connector terminals. It has additionally been found that such connectors may be prefabricated in a highly efficient and predictable manner superior to that heretofore possessed by prior art techniques. Various other advantages will become apparent from the following description giving with reference to the various figures of drawing.

Figure 1:
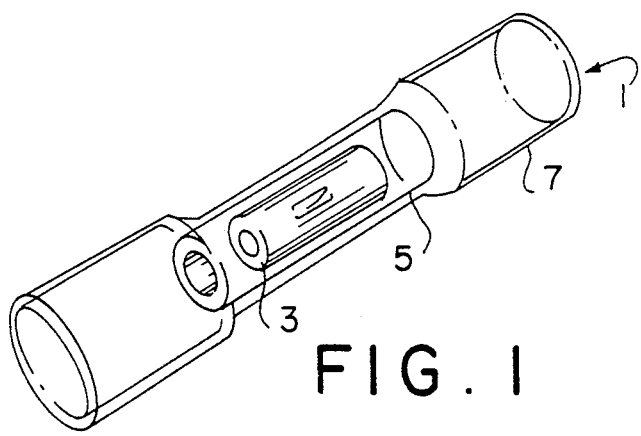
FIG. 1 of the drawings illustrates a butt connector in accordance with this invention.

FIG. 1 of the drawings illustrate a connector 1 in accordance with this invention. The connector illustrated here is a but splice connector which comprises an inner metallic ferrule 3, an insulating sleeve 5, and a transparent outer sleeve 7.

The ferrule 3 in accordance with this invention may be any of the metallic materials heretofore utilized. It is preferred, however, to utilize annealed copper or aluminum due to the malleability and electrical conductivity thereof.

The insulating sleeve 5 is preferably formed of nylon and is attached to the metallic ferrule by conventional techniques wherein a ferrule is force fitted into the insulated sleeve 5. The insulating sleeve extends past both extremities of the ferrule 3 as illustrated with the butt splice connector 1 of FIG. 1. An alternative insulating material is polyvinylchloride. In either event, it is preferred that the insulating sleeve be at least semi-transparent to permit viewing of a conductor location while crimping, so as to assure good electrical contact.

The outer sleeve 7 is preshrunk about the insulating sleeve and adhered thereto by a process to be described below. The outer sleeve 7 is transparent giving an undistorted view of the insulating sleeve 5 and ferrule 3 to thus greatly facilitate use of the device since the user may visually observe the insertion of a conductor into the ferrule 3. In accordance with this invention it has been found that this transparency, together with other desirable characteristics, is brought about by use of a coextruded multi-layer material with at least one layer thereof being oriented and heat-shrinkable, and with the inner layer being a heat-activable adhesive. Such transparency is a multi-layer structure is brought about by coextrusion of the various layers therein. Such coextrusion is described in U.S. Pat. No. 3,354,506 which is herewith incorporated by reference. Prior art structures which are coated rather than coextruded possess surface irregularities as well as inclusions and occlusions at the interface between layers to distort the view therethrough and otherwise adversely affect the transparency thereof. The heat-activable adhesive is preferably formed of a copolymer of ethylene and vinyl-acetate, and becomes self-adhesive at a temperature at which the oriented layer shrinks.

The oriented layer is preferably formed of a cross-linked polymer of ethylene. Such cross-linked polymer may be formed by the process described in U.S. Pat. No. 3,741,253 which is herewith incorporated by reference.

Figure 2:
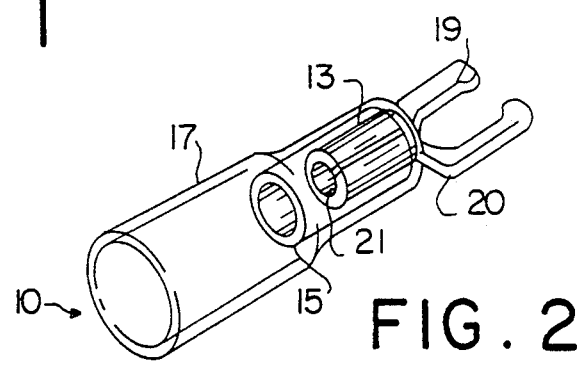
FIG. 2 of the drawings illustrates a connector terminal in accordance with this invention.

FIG. 2 of the drawings illustrates a connector in the form of a connector terminal 10. The connector terminal comprises a crimpable ferrule 13, an insulating sleeve 15, and an outer sleeve 17. All structures just described with respect to FIG. 2 may be identical to the counterparts described in FIG. 1. The insulating sleeve 15 in the FIG. 2 embodiment may with equal preference be formed of polyvinylchloride. The FIG. 2 embodiment in the form of a terminal possesses an exposed connector 19 which may be utilized for a mechanical connection. The exposed connector 19 is illustrated here in the form of a "U" shape, but may also possess other shapes heretofore utilized for terminals, such as an annular shape. The exposed connector 19 is preferably integral with ferrule 13. Like the FIG. 1 embodiment, the outer sleeve 17 of FIG. 2 is preshrunk about insulating sleeve 15 by a process described below.

While the FIG. 2 embodiment illustrates an exposed connector 19, it is understood that connector 19 may be covered by insulating sleeve 15 as has been conventionally, practiced in the art.

The connector terminal 10 of FIG. 2 may on some occasions comprise an additional sleeve interposed between the ferrule 13 and insulating sleeve 15 which tends to funnel toward the opening 21 of ferrule 13 so as to guide a conductor into the ferrule. The outer sleeve 17, however, possesses the same transparency of the outer sleeve 7 of FIG. 1 so that the user thereof may determine whether the conductor has been properly inserted into ferrule 13 and the appropriate location for placement of a crimp in order to assure good electrical contact.

Figure 3:
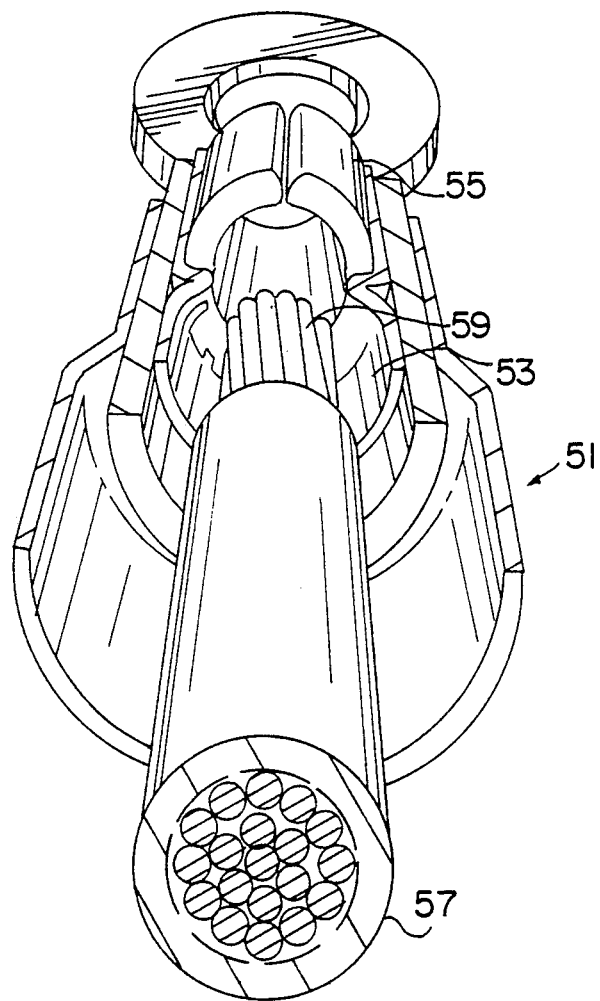
FIG. 3 of the drawings illustrates a connector similar to that of FIG. 2 in another embodiment.

A view of a connector 51 having an interposed sleeve 53 is illustrated in FIG. 3 of the drawings. The interposed sleeve 53 is preferably of seamless brass and funnel shaped for several purposes. The seamless configuration prevents a seamed ferrule 55 from opening. Additionally, interposed sleeve may also be crimped about insulation 57 surrounding conductor 59. Such additional crimp relieves stress from conductor 59 at the point of crimp and absorbs shock during use. Conductor 59 is shown here as a multi-strand conductor.

Figure 4:
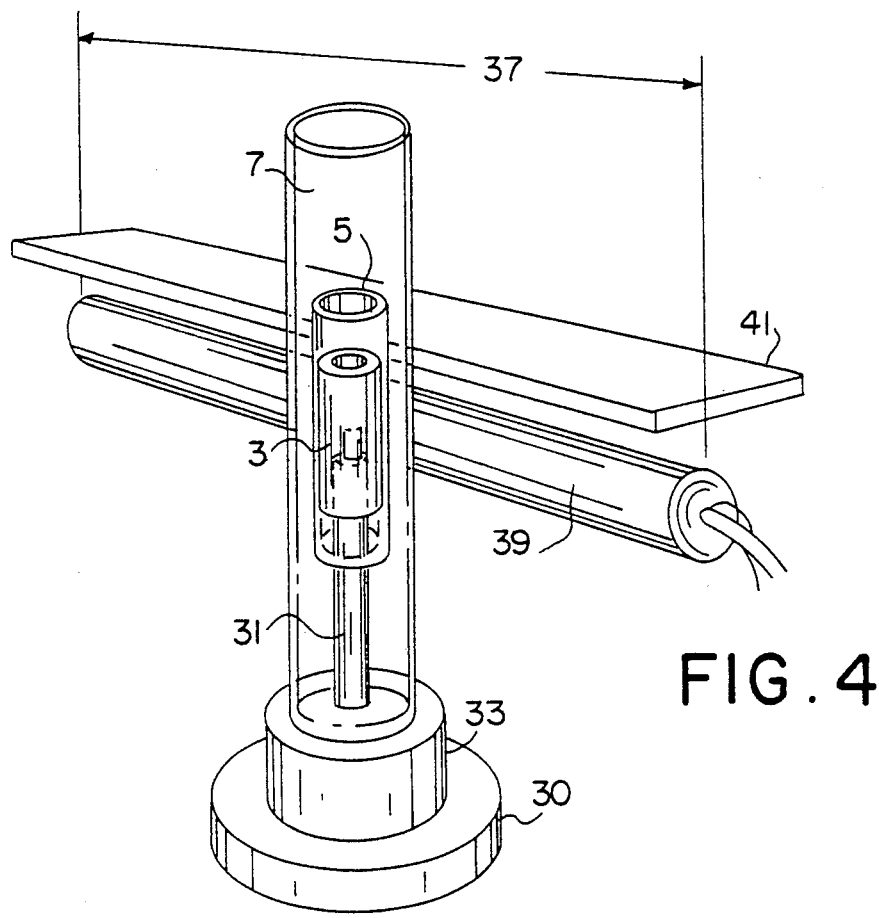
FIG. 4 of the drawings illustrates a process of producing a connector in accordance with this invention.

FIG. 4 of the drawings schematically illustrates a process of forming the connectors in accordance with this invention. A carrier 30 is moveable through a heating zone. As illustrated, a support 31 supports ferrule 3 and insulating sleeve 5. The ferrule and insulating sleeve assembly is vertically oriented about its longitudinal axis. A second support 33 vertically below support 31 supports outer sleeve 7 coaxially about ferrule and insulating sleeve 5. Support 31 emanates from the center of support 33. Support 33 rides upon carrier 30. The process is carried out by appropriately positioning the components upon first support 31 and second support 33. The supports with components thereon are moved through a heating zone 37 which comprises a means for heating 39, preferably in the form of radiant heating means. Radiant heating means 39 may be supplemented by forced air to effect shrinkage of outer sleeve 7 in appropriate locations such as in the central area thereof. A shield such as 41 may be utilized to direct heat flow. Carrier 30 may be moved through a heating zone having heating means such as 39 and shield 41 on both sides thereof to promote uniform shrinkage of outer sleeve 7. Alternatively, carrier 30 may be rotated during movement through the heating zone with heating means on one or both sides thereof. Support 33 may be rotated during movement to promote uniform shrinkage of outer sleeve 7 about ferrule 3 and insulating sleeve 5.

In a like manner, the connector in the form of a connector terminal of FIG. 2 is prefabricated by the same process depicted in FIG. 4 of the drawings. In fact, the same supports utilized to produce the butt connector of FIG. 1 may be utilized for the connector terminal of FIG. 2. In this event, the exposed connector 19 is oriented above first support 31 such that the ferrule 13 and insulating sleeve 15 rest upon support 31. A shorter outer sleeve 17 is utilized and is shrunk so as to terminate near the point where exposed conductor emanates from insulating sleeve 15, as at 20.

The electrical connector, in accordance with this invention, possesses superior characteristics once installed by crimping the metal ferrule in any of the embodiments about a conductor. Once electrical communication is established between a conductor and the metallic ferrule, the outer heat-shrinkable sleeve is heated to activate the shrinking process about the conductor and any insulation thereon. The adhesive interlayer upon heat-shrinkage adheres to the electrical conductor and any insulation, which may be on the conductor to seal out deleterious atmospheric influences. The adhesive interlayer not only seals out atmospheric influences, but also adds to the overall mechanical stability of the electrical connection.

It is thus seen in accordance with this invention a greatly improved connector has been provided wherein a multi-layer outer sleeve possesses a high transparency to aid in the use thereof, as well as possessing a multi-layer structure so as to provide both heat-shrinkable orientation and adhesive characteristics. A novel process has been provided for the prefabrication thereof. As various modifications will become apparent to those in the art from a reading of the above description, such modification are within the scope of this invention as fall within the spirit and scope of the following appended claims.

What is claimed is;

1. A process for forming a termination on an electrical conductor for mechanical attachment into an electrical circuit comprising the steps of:
  providing an electrical connector comprising:
    a crimpable ferrule,
    a transparent outer sleeve surrounding said ferrule in a longitudinal direction, said outer sleeve formed of coextruded, multi-layer material, with at least one layer thereof being oriented and heat shrinkable, and with the inner layer thereof being a heat-activable adhesive, and
    an exposed connector unsurrounded by said outer sleeve in electrical communication with said ferrule, said exposed connector being generally U-shaped or annularly shaped, said exposed connector defining means for receipt of a mechanical connection through the center thereof in a direction transverse to said longitudinal direction,
    said outer sleeve being preshrunken on one end thereof into conformity with said ferrule on an end thereof closest to said exposed connector, said outer sleeve being of greater diameter and generally unshrunken on the end thereof opposite said preshrunken one end for receipt of a conductor therein;
  placing an end of said conductor into said unshrunken opposite end of said sleeve and into said crimpable ferrule;
  viewing the location of said conductor through said transparent outer sleeve to assure proper location of said conductor for the crimping thereof;
  applying pressure to said outer sleeve to crimp said crimpable ferrule through said outer sleeve into electrical communication with said conductor; and
  applying heat to said outer sleeve to shrink said outer sleeve into conformity with said electrical conductor and to activate said heat activable adhesive to bond said outer sleeve with said conductor.

* * * * *